No. 796,073. PATENTED AUG. 1, 1905.
F. M., J. S. & W. W. HILTON.
VEHICLE TIRE.
APPLICATION FILED OCT. 11, 1904.
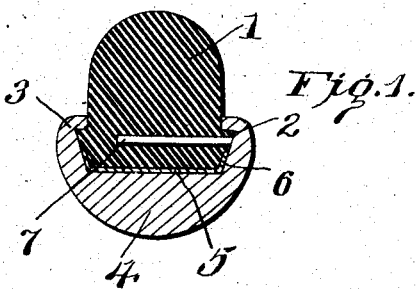
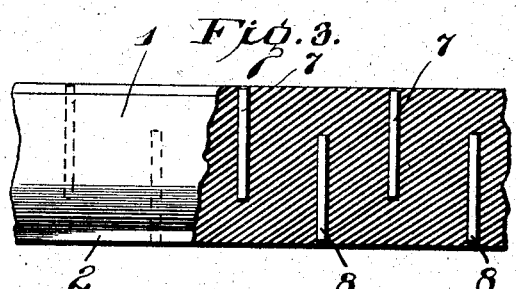
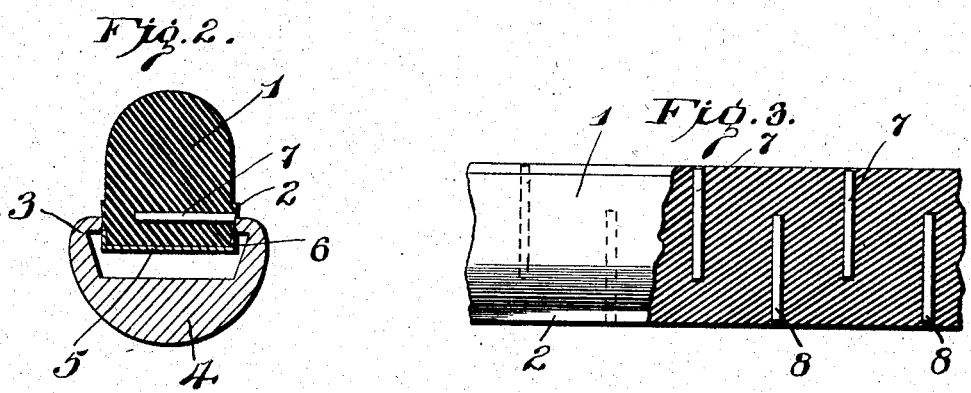
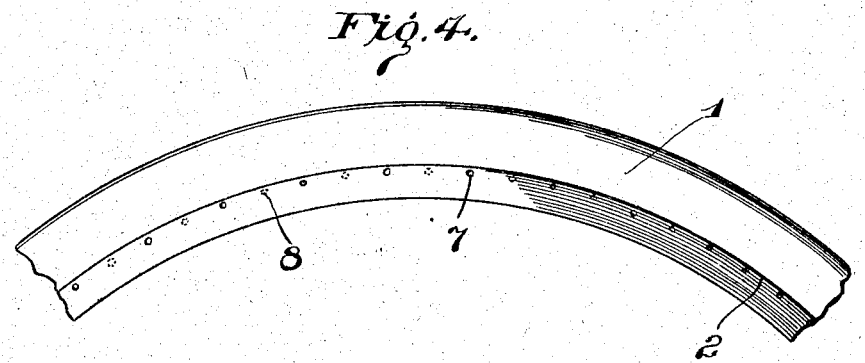

UNITED STATES PATENT OFFICE.

FRANK M. HILTON, JOHN S. HILTON, AND WILLIAM W. HILTON, OF AKRON, OHIO.

VEHICLE-TIRE.

No. 796,073.  Specification of Letters Patent.  Patented Aug. 1, 1905.

Application filed October 11, 1904. Serial No. 228,029.

*To all whom it may concern:*

Be it known that we, FRANK M. HILTON, JOHN S. HILTON, and WILLIAM W. HILTON, citizens of the United States, residing at Akron, in the county of Summit and State of Ohio, have invented certain new and useful Improvements in Vehicle-Tires, of which the following is a specification.

Vehicle - wheels supplied with yielding treads or soft tires usually have the latter cemented to the rims or held thereto by binders or by clencher-rims, the latter having an inturned portion or flange to engage over a projecting portion of the tire.

The present invention appertains to the clencher type of tire; and it consists of a rim or channel iron having inturned longitudinal edge portions or flanges to engage over outer flanges at the sides of the tire and the ends of metal pins embedded in the tire, said pins being provided in alternate series or sets and of less length than the width of the tire, one end of the pins of a set projecting to be engaged by a flange of the rim or channel-iron and the other end terminating a distance from the opposite side of the tire and the pins of the other set being alternately arranged and oppositely disposed and having one end extended to be engaged by the other flange of the rim and the opposite end falling short of the side of the tire containing the projecting ends of the first-mentioned set of pins.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a transverse section of the tire-rim portion of a vehicle - wheel embodying the invention. Fig. 2 is a view similar to Fig. 1, showing the side portion of the tire compressed so as to clear the inner edges of the flanges or inturned portions of the rim or channel - iron when pressing the tire in position. Fig. 3 is a detail view of a length of tire embodying the invention, a portion being broken away so as to show more clearly the relative arrangement of the pins. Fig. 4 is a side view of a length of tire constructed in accordance with the invention.

Corresponding and like parts are referred to in the following description and indicated in all the views of the drawings by the same reference characters.

The tire 1 may be of any construction, either of the pneumatic or cushion type or other make commonly employed for vehicle-wheels designed to have a soft yielding tread. Flanges 2 project from opposite sides of the tire and are designed to engage under inturned portions or flanges 3 of the rim or channel-iron 4. A strip 5 of heavy textile, such as canvas or duck, is vulcanized to the inner side of the tire and its longitudinal edge portions extend so as to embrace edge portions of the flanges 2, as indicated at 6, the purpose being to materially strengthen the base portion of the tire and prevent the retaining-pins from cutting therethrough when subjected to abnormal strain. The reinforcing or strengthening strip 5 is vulcanized or otherwise attached to the tire, so as to form, in effect, a part thereof.

Pins are embedded in the base portion of the tire and are provided in two sets or series, which for convenience are indicated by the reference-numerals 7 and 8. The pins are of a less length than the width of the base portion of the tire and are arranged so that an end portion of the pins of each set or series extend so as to be engaged by an inturned portion or flange 3 of the rim or channel-iron. The pins 7 of one set or series alternate with the pins of the other set or series and all the pins are preferably uniformly spaced, so as to evenly distribute the retaining-points in the circumferential length of the tire. The pins are molded in the tire, and the extended ends just clear the edges of the parts 6 of the reinforcing-strip 5, so that the strain may be sustained by the combined resisting action of the rubber and the reinforcing-strip. The extended ends of the pins have their terminal portions projected into the flanges 2 of the tire, so as to come beneath the flanges or inturned portions 3 of the rim or channel-iron 4. It is not intended that the extremities of the pins should project beyond the sides of the flanges 2, but to come about flush therewith. The inner ends of the pins terminate some distance from the side of the tire opposite to that containing the projecting ends of the pins, thereby admitting of the base portion of the tire being compressed to an extent to readily admit of the pins and the flanges 2 clearing the inner edges of the flanges 3, as indicated most clearly in Fig. 2. After the base portion of the tire has cleared the flanges 3 of the rim or channel-iron the flanges 2 of the tire spring outwardly, carrying with them the engaging ends of the pins, thereby underlapping the flanges 3, which serve to securely and firmly retain the tire in position without the employment of cement or other extraneous fastening means.

The rim or channel-iron 4 may be rolled or otherwise formed, and the flanges 3 may be provided in any practical manner, so as to supply a substantial article. The pins may be of any form in cross-section and are preferably of metal and are arranged about in the plane of the shoulders formed by the flanges 2 of the tire.

In some instances the pins may be pressed into the sides of the tire either before or after vulcanization or introduced in any manner so as to be embedded in the completed tire. Dampness may be excluded from between the rim and tire by interposing a layer of cement, which will also assist in retaining the tire in place.

Having thus described the invention, what is claimed as new is—

In combination, a rim or channel-iron having inturned flanges, a soft tire having integral flanges along the sides thereof adjacent its base, transverse pins embedded in the base of the tire and arranged with the ends of alternate pins about flush with the sides of the base of the tire at a point between the tread or under side thereof and the upper sides of the flanges integral therewith, and a strip of fabric material attached to the base or bottom of the tire and extended outwardly so as to partially cover the sides of the flanges of the tire, the upper edge of said strip just clearing the outer ends of the pins flush with the sides aforesaid.

In testimony whereof we affix our signatures in presence of two witnesses.

FRANK M. HILTON. [L. S.]
JOHN S. HILTON. [L. S.]
WILLIAM W. HILTON. [L. S.]

Witnesses:
A. E. KLING,
H. A. BEERS.